United States Patent [19]

Sadovnik et al.

[11] Patent Number: 5,305,123
[45] Date of Patent: Apr. 19, 1994

[54] LIGHT CONTROLLED SPATIAL AND ANGULAR ELECTROMAGNETIC WAVE MODULATOR

[75] Inventors: Lev S. Sadovnik, Los Angeles; Tomasz P. Jannson, Torrance; Vladimir Manasson, Los Angeles, all of Calif.

[73] Assignee: Physical Optics Corporation, Torrance, Calif.

[21] Appl. No.: 818,805

[22] Filed: Jan. 9, 1992

[51] Int. Cl.$^5$ .......................... G02F 1/03; G02F 1/29; G03H 5/00; G03H 1/00
[52] U.S. Cl. .......................................... 359/4; 356/347; 356/349; 359/7; 359/21; 359/299; 359/350
[58] Field of Search ................ 359/4, 7, 299, 300, 359/21, 350; 356/347, 349

[56] References Cited

U.S. PATENT DOCUMENTS

| | | | |
|---|---|---|---|
| 3,388,396 | 6/1968 | Rope et al. | 356/347 |
| 3,914,056 | 10/1975 | Mottier et al. | 356/347 |
| 4,190,811 | 2/1980 | Alcock et al. | 359/299 |
| 4,773,739 | 9/1988 | Valley et al. | 359/300 |
| 4,898,436 | 2/1990 | Cheng et al. | 359/7 |
| 4,913,534 | 4/1990 | Lafleur et al. | 359/300 |
| 4,948,212 | 8/1990 | Cheng et al. | 359/7 |
| 4,973,154 | 11/1990 | McMichael et al. | 356/349 |
| 5,004,325 | 4/1991 | Glass et al. | |
| 5,018,852 | 5/1991 | Cheng et al. | 356/347 |
| 5,044,726 | 9/1991 | Grego | 359/561 |
| 5,097,357 | 3/1992 | Ranganathan et al. | 359/243 |
| 5,131,748 | 7/1992 | Monchalin et al. | 356/349 |
| 5,150,228 | 9/1992 | Liu et al. | 359/7 |

OTHER PUBLICATIONS

Saleh et al., "Fundamentals of Photonics," John Wiley and Sons, Inc., New York, 1991, pp. 550 and 758.
Shih et al., "Photo-Induced Complex Permittivity Measurements of Semiconductors," SPIE vol. 477 Optical Technology for Microwave Applications, 1984, pp. 94 to 100.
Vasey et al., "Electro-Optic AlGaAs Spatial Light Deflector/Modulator Based on a Grating Phased Array," Appl. Phys. Lett., vol. 58, No. 25, Jun. 24, 1991, pp. 2874 to 2876.
Cheng et al., "Optically Activated Integrated Optic Mach-Zehnder Interferometer on GaAs," Appl. Phys. Lett., vol. 59, No. 18, Oct. 28 1991, pp. 2222 to 2224.
Bennett et al., "Carrier-Induced Change in Refractive Index of InP, GaAs, and InGaAsP," 26 IEEE J. Quan. Elec. 113 to 122, 1990.
A. Yariv, "Phase Conjugate Optics and Real-Time Holography," *IEEE Journal of Quantum Electronics*, vol. QE-14, No. 9, Sep. 1978, pp. 650 to 660.

*Primary Examiner*—Martin Lerner
*Attorney, Agent, or Firm*—Nilles & Nilles

[57] ABSTRACT

A 2D/3D optically controlled spatial and angular electromagnetic wave modulator is disclosed. The modulator of the present invention modulates the amplitude and direction of an electromagnetic wave such as millimeter microwaves or infrared waves by diffracting or scattering the electromagnetic wave from a semiconductor material upon which is incident a controlling lightwave. The lightwave incident upon the semiconductor is of varying intensity, and may be time varying, and changes the complex refractive permittivity of the semiconductor material. The electromagnetic wave is thus modulated in accordance with the controlling lightwave.

14 Claims, 3 Drawing Sheets

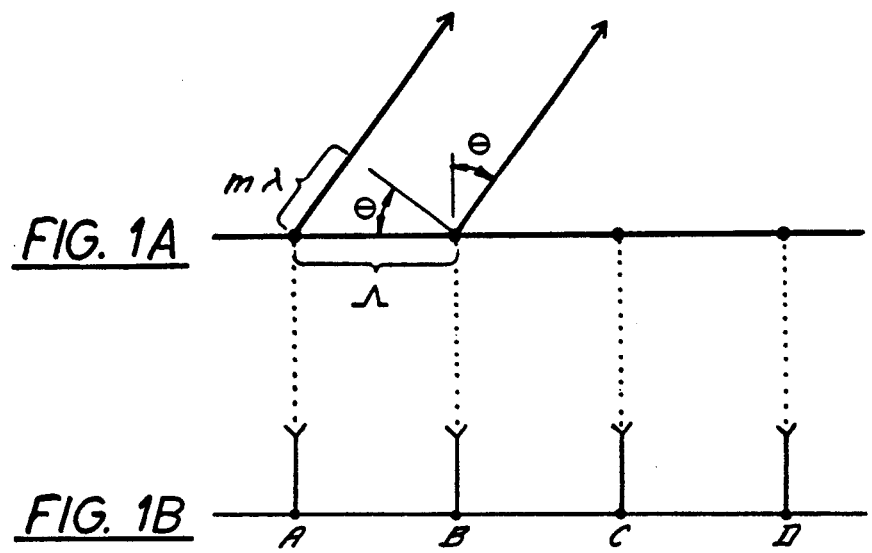
FIG. 1A
FIG. 1B
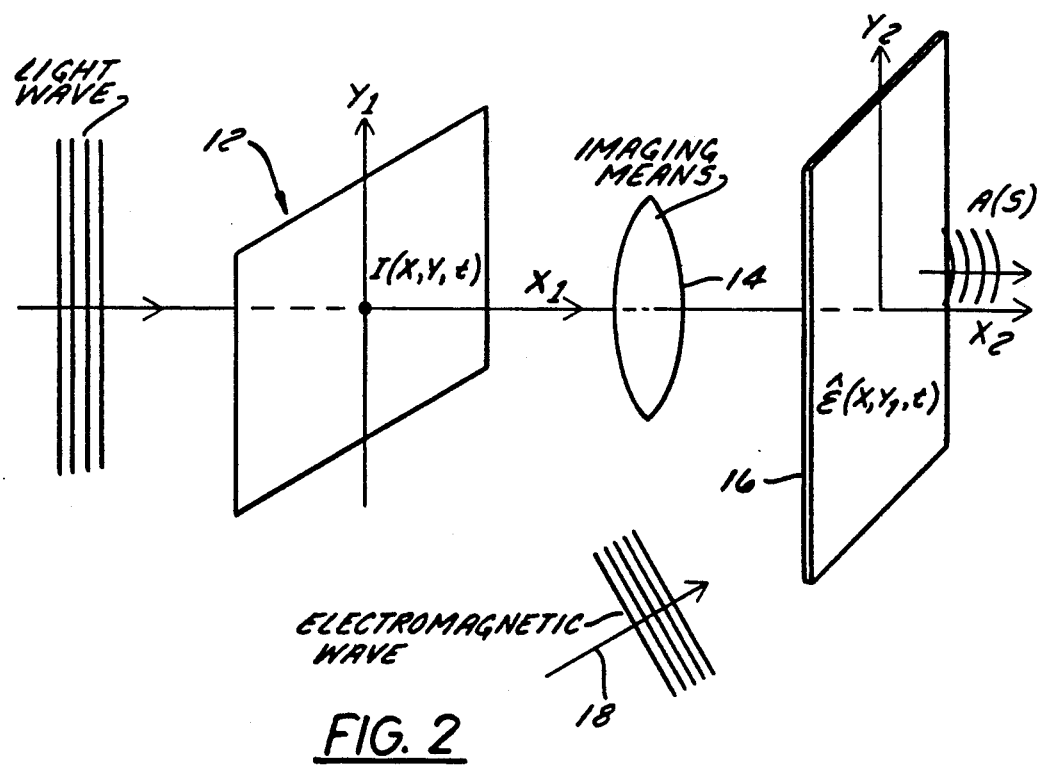
FIG. 2

LIGHT CONTROLLED SPATIAL AND ANGULAR ELECTROMAGNETIC WAVE MODULATOR

BACKGROUND OF THE INVENTION

1. Field of the Invention

This invention pertains to the spatial and angular modulation of electromagnetic waves. More particularly, this invention relates to optically controlling the spatial and angular modulation of electromagnetic waves incident upon a semiconductor material by optically changing the complex permittivity of the semiconductor material.

2. Description of the Prior Art

Light can change the complex refractive index n of a semiconductor material. Specifically, n=n (I) where n=n′+in″ (where n′ and in″ are the real and imaginary parts respectively and $i=\sqrt{-1}$) and I is the intensity of the optical wave. The mechanics of this phenomenon is based on fundamental Drude theory. See T. S. Moss, "Optical Properties of Semiconductors," Butterworths, London (1959).

The intensity I of an optical wave can change the complex refractive index of Si, GaAs, InGaAsP and other semiconductors in the microwave range (1 mm−1 cm) and infrared (IR) range (1.0μ− 100μ). See I. Shih, "Photo-Induced Complex Permittivity Measurements of Semiconductors" 477 SPIE 94 (1984) (microwave range) and B. Bennett, "Carrier-Induced Change in Refractive Index of InP, GaAs, and InGaAsP" 26 IEEE J. Quan. Elec. 113 (1990) (IR range) incorporated herein by reference.

The prior art shows light induced modulation of both the real and imaginary parts of the refractive index. The real part controls phase and the imaginary part controls amplitude of the modulated electromagnetic field. The real part is primarily responsible for changes in IR waves and the imaginary part for changes in millimeter waves (MMW). This effect is described by Drude theory and involves carrier induced changes in the complex permittivity of metals and semiconductors when illuminated by light. Light increases the density of free carriers in the material.

Based on this effect, devices which change the phase of lightwaves by illumination of semiconductors with other light have been developed. Specifically, optical phase modulators have been employed. In the state of the art, however, it is shown possible to modulate the material at only one point. This type of limited modulation is discussed in a recent article by Z. Y Cheng and C. S. Tsai "Optically Activated Integrated Optic Mach-Zender Interferometer on GaAs," 59 Appl. Phys. Lett. 1991. It would be beneficial to employ a device that can modulate an EM field at more than one point, particularly to modulate the material in two dimensions (2D) and potentially three dimensions (3D).

At the same time, optically controlled spatial light modulators (SLM) based on semiconductor materials have been used. In optically addressed SLMs, the semiconductor plays a transport role, such that changes in the semiconductor material affect an adjacent layer of electro-optic (EO) material which in turn affects an EM wave propagating through the EO material. The effectiveness of this type of modulator is low. It should be mentioned that these devices are limited to controlling the visible range only.

These SLM devices transmit or project some 2D pattern which can be transmitted through an optical wave. Other types of devices that are of interest, however, transmit EM waves in a particular direction in the microwave region without moving parts. Such devices are called phased array antennas.

A phased array is a network of radiating elements, each of which is usually non-directive but whose cooperative radiation pattern is a highly directed beam because constructive interference occurs between radiating elements. Whereas previous radar antennas had to be mechanically steered for beampointing, the phased array antenna achieves the same effect electronically by individually changing the phases of the signals radiating from each element. Narrow angular band beams can be formed by simply driving each element of the array with an appropriately phased signal. Moreover, electronic steering is much faster and more agile than mechanical beam steering and can form several beam lobes and nulls to facilitate multiple target tracking or other functions such as anti-jamming.

The flexibility of electronic steering afforded by phased array radars, however, comes at the cost of individual control of each element. The N elements of the antenna are driven with the same signal but each with a different phase. In practice, a single signal is equally split into N signals to feed the elements, and a phase shifting network, such as those using ferrites or diodes, is provided for individual phase control of each element. For large arrays (i.e., N>100), the complexity of the power splitting network and the cost of providing N phase shifters can become quite high, not to mention the bulkiness of the necessary waveguide plumbing. Moreover, for very large arrays, the computation required to calculate the array phase distribution for a desired radiation pattern is a serious burden. These constitute the most serious drawbacks of conventional phased array radar systems.

Phased array antenna theory is based on Fourier optics in general and the theory of diffraction gratings in particular. It is well known from Fourier optics that the optical beam is diffracted in a particular direction if the phase difference between the particular optical rays is a multiple of the wavelength of the optical beam.

According to FIG. 1A, the phase synchronized condition has the form mλ=Λ sin θ, where Λ is the grating constant, θ is the angle of diffraction, and m is the integers 0, ±1, ±2 . . . . From this equation we obtain the following equation $$\sin\theta = m \cdot \frac{\lambda}{\Lambda} \qquad \text{(Eq. 1)}$$

which is the well known grating equation. If electrically controlled, a phase shift of mλ can be introduced between different antennas thereby causing constructive interference in one direction, which results in antenna directionality. This effect can be used in both a transmitter and a receiver.

Exactly the same principle is used in conventional phased array antennas where illuminated points of the gratings are replaced by elementary antennas as in FIG. 1B. See M. I. Skolnik, "Introduction to Radar Systems", McGraw Hill New York (1980) incorporated herein by reference.

Using Equation 1 two basic disadvantages of phased array antenna systems are made apparent: (1) the periodic structure has a discrete point-type profile. This means that many diffraction orders are generated; only one order is desired, and the remaining orders reduce efficiency of the system; (2) the number of elementary antennas is limited by size and complexity. As the frequency of the microwaves increase (beyond 60 GHz), the density of packaging of individual elements and phase shifters limits the feasibility of such an antenna. Also, having individual emitters fixed in space precludes the antenna from being used for different frequencies. At the receiver end, such an antenna has limited bandwidth capability (due to the fixed elements).

For IR beam steering the packaging of individual phase shifters is virtually impossible and an electronically controlled spatial light detector is limited to very narrow angular bandwidth. See F. Vasey et al., "Electro-optic AlGaAs Spatial Light Deflector/Modulator Based on a Grating Phased Array" 58 Appl. Phys. Lett. 2874 (1991) incorporated herein by reference.

SUMMARY OF THE INVENTION

A 2D/3D optically controlled spatial and angular electromagnetic wave modulator is disclosed. The modulator of the present invention modulates the amplitude and direction of an electromagnetic wave such as millimeter microwaves (MMW) or IR waves by diffracting or scattering the electromagnetic wave from a semiconductor material upon which is incident a controlling optical wave. The optical wave incident upon the semiconductor is of varying intensity, and may be time varying, and changes the complex refractive index of the semiconductor material. The electromagnetic wave is thus reflected from or transmitted through the semiconductor plate and modulated in accordance with the controlling light signal.

In this way the intensity and angular position of an outgoing electromagnetic wave may be controlled thus providing not only a modulated wave but a steered beam as well. Likewise, the present invention is able to locate and track a source of electromagnetic wave energy when used as a receiver. The modulator of this invention overcomes the numerous disadvantages attendant conventional phased array antennas which inherently operate as a plurality of point sources. The modulator of the present invention instead may act as a continuously distributed antenna thus eliminating the need for a plurality of point sources and their associated phase controlling circuitry, does not generate second order effects, and may modulate the electromagnetic wave with virtually unlimited flexibility.

In one embodiment, a millimeter wave (MMW) source provides a collimated MMW wave which is reflected from and reshaped by a semiconductor plate illuminated from the opposite side by an optical light control pattern to produce a desired formed and steered beam which is then decoupled from the plate.

In another embodiment, using a polished semiconductor plate, a Fabry-Perot structure is created which creates local areas of constructive or destructive interference and is analogous to an all-optic IR SLM. In yet a further embodiment of the present invention, the spatial distribution of complex permittivity of the semiconductor plate can be made more complex than with a simple diffraction grating by employing a computer generated holographic pattern, thus creating a 3D holographic pattern in the IR and MMW regions.

DESCRIPTION OF THE DRAWINGS

FIGS. 1A and B are schematics of point gratings of prior art phased array antennas;

FIG. 2 is a schematic showing the operation of the optically controlled electromagnetic wave modulator of the present invention;

DESCRIPTION OF THE PREFERRED EMBODIMENTS

In this invention, a 2D/3D distribution of light intensity spatially modulates a second EM wave. This is accomplished by transforming the 2D/3D light intensity pattern into an analogous 2D/3D distribution of the electrical complex permittivity of a semiconductor material such as Si, or GaAs or others in the form I (x, y, z) = $\hat{E}$ (x, y, z) and to directly spatially modulate the EM wave by diffraction or scattering of the EM wave on the 2D/3D distribution of electrical complex permittivity of the semiconductor material.

If the 2D/3D distribution of light intensity varies with time, so will the 2D/3D distribution of electrical complex permittivity according to the following equation:

$$I (x, y, z; t) \rightarrow \hat{E} (x, y, z; t) \quad \text{(Eq. 2)}$$

Therefore, time spatial modulation of the incident EM wave is achieved.

In general, semiconductor scattering media can be 3D but in the case of a thin semiconductor plate, the 3D modulation effect may be treated as 2D if the depth of penetration of the lightwave is negligible. In such a case we obtain $$I (x, y_i; t) \rightarrow \hat{E} (x, y_i; t) \quad \text{(Eq. 3)}$$

In FIG. 2, the 2D optical intensity pattern 12 ($x_1, y_1$) is imaged by imaging means such as a lens 14 onto a semiconductor plate ($x_2, y_2$) 16, generating an analogous continuous 2D distribution of complex permittivity in the semiconductor plate. The incident EM wave 18 is diffracted on the semiconductor plate 16 and is directly spatially modulated. The reflection modulation effect can be described in a similar way.

Figure 3:
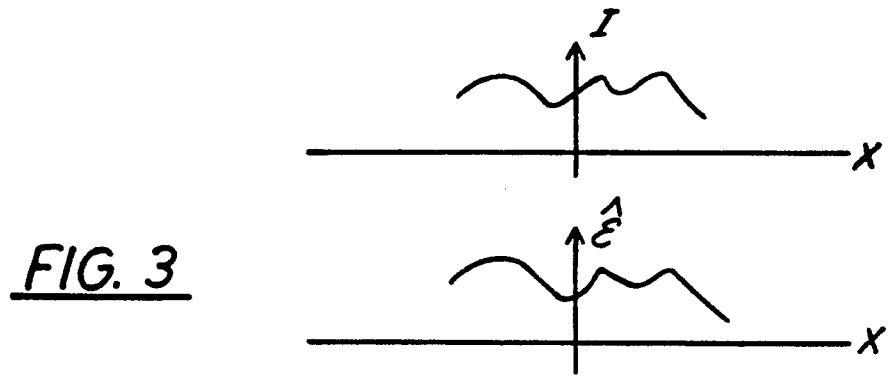
FIG. 3 is a schematic showing the relationship between the permittivity E in the semiconductor plate and the intensity pattern I of the lightwave.

The permittivity $\hat{E}$ in the semiconductor plate corresponds to the intensity pattern at the same plane as shown in FIG. 3 for the 1D case.

Table 1 illustrates the correspondence between the level of light intensity and changes in the complex permittivity (real and imaginary part) and semiconductor transmittance and reflectance: $\lambda_{ph}$ is the wavelength of the illuminating light, n and k are, respectively, the real and imaginary parts of the complex refractive permittivity, and $\lambda_{ph}$ is the wavelength of the electromagnetic wave to be steered.

TABLE 1

| Light Power Density (mW/cm²) $\lambda_{ph} = 0.95$ μm | 0 | 5 | 10 | 20 | 30 | 50 |
|---|---|---|---|---|---|---|
| n ($\lambda$ = 3 mm) | 3.42 | 3.63 | 4.05 | 4.8 | 5.64 | 7.0 |
| k ($\lambda$ = 3 mm) | $2.5 \cdot 10^{-3}$ | 1.35 | 2.4 | 4.0 | 5.21 | 7.0 |
| Reflectance % ($\lambda$ = 3 mm) | 30 | 38 | 48 | 62 | 68 | 75 |
| Transmittance % ($\lambda$ = 3 mm) | 99.3 | 4 | 0.1 | 0 | 0 | 0 |

Figure 4:
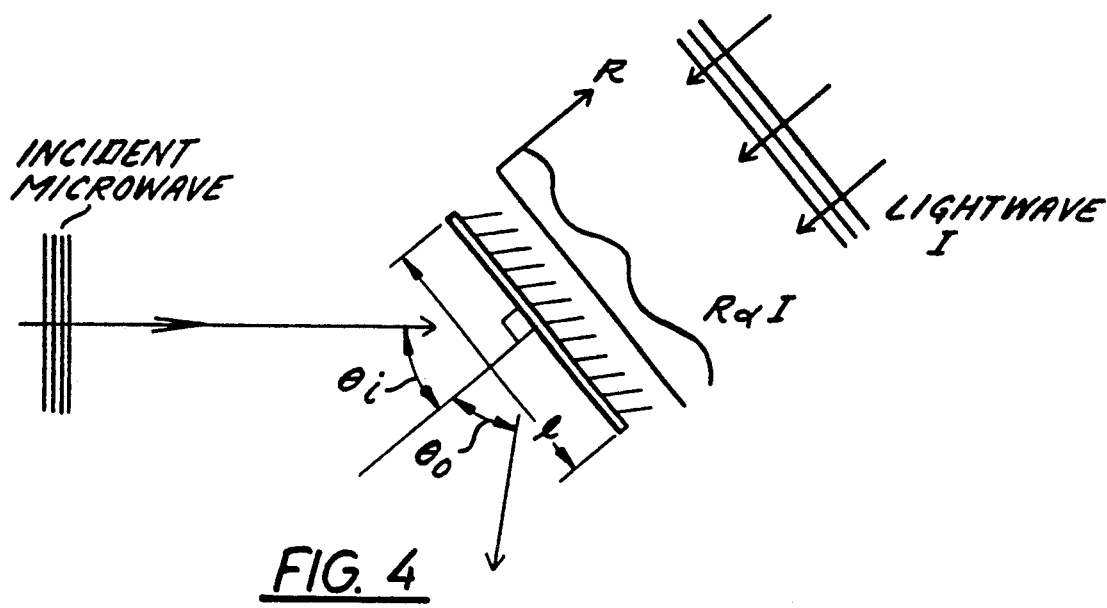
FIG. 4 is a schematic of a continuously distributed transmitting antenna of the present invention.

As an illustrative example, we consider the system of the present invention as an analog of a phased array antenna system. In such a case, the general distribution of E as in FIG. 2, $\hat{E}(x,y; t)$, becomes periodic and, as a consequence, the reflection coefficient R of the semiconductor plate will become an analogous periodic function for a particular incident EM wave of interest. As shown in FIG. 4, the grating equation has a the following form:

$$\sin\theta_0 + \sin\theta_i = \frac{\lambda m}{\Lambda} \quad \text{(Eq. 4)}$$

where $\theta_i$ is the angle of incidence and $\theta_0$ is the angle of diffraction. However, since the grating now has a sinusoidal profile, not a point profile as before, only the first diffraction order is present. Consequently, m=0, ±1.

A steering effect can be realized by changing the grating period $\Lambda$ according to $$\Lambda = \Lambda(t) \rightarrow \theta_0 = \theta_0(t) \text{ for } \theta_i = \text{Constant} \quad \text{(Eq. 5)}$$

It should be emphasized that the grating period projected on the semiconductor plate can have an arbitrary orientation and therefore the steering process can be 2D and can satisfy any specific azimuth and elevation or any specific spherical angle position $(\theta,\phi)$. This system may be called by analogy to a phased array antenna, a light controlled continuously distributed antenna. In this system, instead of introducing the phase shift to numerous individual elements, as in conventional phased array antennas, a time-varying periodic pattern is formed in the semiconductor to accomplish steering.

The advantages of such a system are substantial. First, the profile of the grating is continuous rather than binary (and can be sinusoidal providing only first diffraction orders). Second, the angular divergence of the diffracted beam is limited only by the size of the semiconductor plate, not by the number of elementary emitters as in a conventional phased array antenna. Third, the packaging density limitation found in conventional phased array antennas is eliminated, which is of great importance for higher frequency. Fourth, the system automatically provides 2D steering while in the conventional case it is necessary to produce a 2D antenna array. Fifth, virtually any diffraction pattern can be used for beam forming. High side lobe suppression can be achieved as a result.

The proper receiving of an EM wave is provided in a similar way to the steering process. Using the diffraction equation in reverse, the following obtains:

$$\sin\theta_i' + \sin\theta_o'(t) = m\frac{\lambda}{\Lambda(t)} \quad \text{(Eq. 6)}$$

Figure 5:
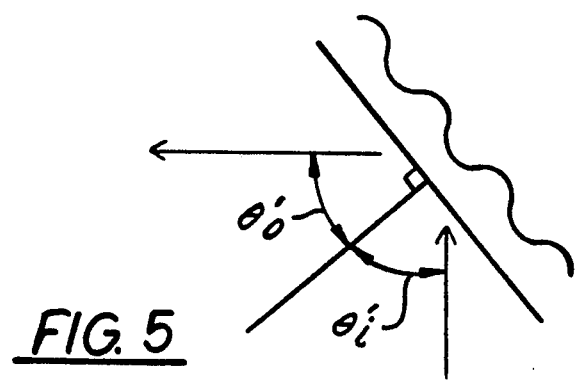
FIG. 5 is a schematic of a continuously distributed receiving antenna of the present invention.

This equation is illustrated in FIG. 5. In this system, all possible incident angles of arrival $\theta_i'$ are scanned in order to satisfy Equation 6 by synchronizing $\theta_i'$ with the 2D period of the grating so that for only one particular moment of time $\theta_o'(t)$ equals $\theta_o$ and the diffracted beam falls upon the detector. In this way, the angle of arrival of the EM wave can be determined and its source tracked.

Figure 6:
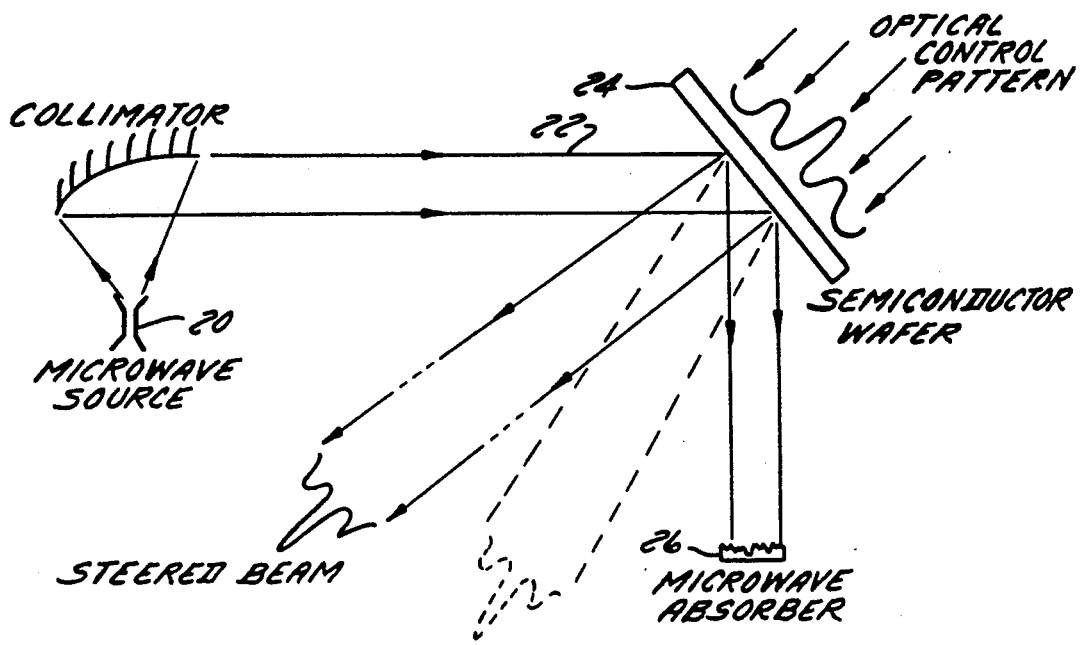
FIG. 6 is a schematic of a specific embodiment of a MMW steering antenna of the present invention.
Figure 7:
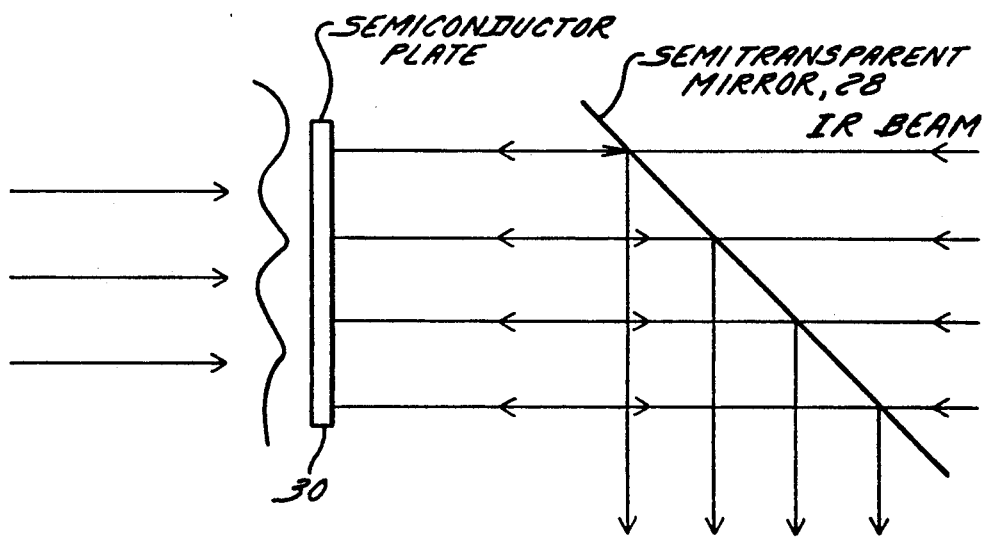
FIG. 7 is a schematic of a Fabry-Perot-type modulator of the present invention which is analogous to an all-optic IR SLM.

A particular example of a transmitter is shown in FIGS. 6 and 7. In FIG. 6, a single MMW source 20 provides a collimated MMW wave 22 which is reflected and reshaped by the semiconductor plate 24 illuminated from the opposite side by an optical light control pattern. The MMW wave is reflected from the plate to produce the desired formed and steered beam. The form of the beam is the Fourier transform of the optical light control pattern. Any undiffracted orders are absorbed by microwave absorber 26. The direction of the beam is determined by the variation of the optical control pattern.

Yet another important application of the present application is providing transmitted or reflected spatial light modulation of an IR beam. In such a case, the optical incident beam, visible or near IR, is projected through semitransparent mirror 28 onto a semiconductor plate 30 creating a 2D pattern distribution according to FIG. 2 above. The second EM wave such as that in FIG. 2 is now an IR wave as shown in FIG. 7. If the semiconductor mirror 30 in FIG. 7 is polished to optical quality on both sides and its thickness t is proper, namely so that the optical path difference is $$\Delta L = \frac{\lambda}{2} \cdot (2N + 1)n \quad \text{(Eq. 7)}$$

where N is an integer and n is the real part of the refractive index of the plate, then a Fabry-Perot structure is created and almost no reflectance is observed under normal incidence.

In this system, the light illuminating the semiconductor mirror 30 in FIG. 7 will cause a change in the permittivity of the plate, and as a result destructive interference of the IR beam will be replaced by constructive interference of the beam where there is illumination. By providing spatial distribution of the light pattern, we can create local areas of constructive or destructive interference and realize the analog of an all-optic IR SLM. Referring again to FIG. 2, the spatial distribution of complex permittivity can be more complex than with a simple diffraction grating. In particular, such structure can be a standard computer generated holographic pattern that can create a 3D holographic image in the IR and MMW regions. No state of the art holographic materials exist in these regions and thus this invention now makes it possible to holographically modulate and steer IR and MMW waves in complex fashion. Collier, "Optical Holography" Academic Press (1971), incorporated herein by reference, provides a general discussion of holography and holographic materials.

It is to be understood that embodiments of the present invention not disclosed herein are fully intended to be within the scope of the claims.

We claim:

1. A multi-dimensional modulator for spatially modulating an electromagnetic wave with a controlling light wave, the modulator comprising:

a semiconductor material having an absorption band;

a first source of light having a wavelength spectrum located within the absorption band of said semiconductor material;

means for spatially modulating said light with information in the form of a 2-D pattern to generate said controlling light wave;

means for delivering said controlling light wave onto the surface and into the volume of said semiconductor material, said controlling light wave generating a 2-D distribution of the complex permitivity of said semiconductor material which follows the pattern of said controlling light wave;

a second source of said electromagnetic wave, said second source having a different wavelength spectrum than said first source and outside said absorption band, said second source arranged so that said electromagnetic wave is incident upon said semiconductor material and is directly spatially modulated in accordance with the changing complex permitivity of said semiconductor material generated by said controlling light wave.

2. The invention as defined in claim 1 further characterized in that the electromagnetic wave is reflected from said semiconductor material.

3. The invention as defined in claim 1 further characterized in that the electromagnetic wave is transmitted through said semiconductor material.

4. The invention as defined in claim 1 wherein said material is thin so that the variation in complex permitivity is substantially in two dimensions.

5. The invention as defined in claim 1 wherein said semiconductor material is thick so that the variation in complex permitivity is in three dimensions.

6. The invention as defined in claim 1 wherein the lightwave is in the range visible to near IR.

7. The invention as defined in claim 1 wherein the electromagnetic wave is substantially in the range 1–100 $\mu$m.

8. The invention as defined in claim 1 further characterized in that the complex permitivity of said semiconductor material is periodic and varies with time.

9. The invention as defined in claim 1 wherein the light incident upon said semiconductor material creates a holographic interference pattern so that outgoing electromagnetic waves form a 3-dimensional holographic image.

10. A multi-dimensional modulator for spatially modulating an electromagnetic wave with a controlling light wave, the modulator comprising:

a semiconductor material having an absorption band;

a first source of light having a wavelength spectrum located within the absorption band of said semiconductor material;

means for spatially modulating said light with information in the form of a 2-D pattern to generate said controlling light wave;

means for delivering said controlling light wave onto the surface and into the volume of said semiconductor material, said controlling light wave generating a 2-D distribution of the complex permitivity of said semiconductor material which follows the pattern of said controlling light wave;

a second source of said electromagnetic wave, said second source arranged so that said electromagnetic wave is incident upon aid semiconductor material and is directly spatially modulated in accordance with the changing complex permitivity of said semiconductor material generated by said controlling light wave, said electromagnetic wave being substantially in the range 1 mm–1 cm.

11. A continuously distributed light controlled antenna employing a controlling light wave and providing 2-dimensional control of an electromagnetic wave, the antenna comprising:

a semiconductor material having an absorption band;

a first source of light having a wavelength spectrum located within the absorption band of said semiconductor material;

means for spatially modulating said light with information in the form of a 2-D pattern to generate a controlling light wave;

means for delivering said controlling light wave onto the surface and into the volume of said semiconductor material, said controlling light wave generating a 2-D distribution of the complex permitivity of said semiconductor material which follows the pattern of said controlling light wave;

a second source of said electromagnetic wave, said second source having a different wavelength spectrum than said first source and outside said absorption band, said second source arranged so that said electromagnetic wave is incident upon said semiconductor material and is directly spatially modulated in accordance with the changing complex permitivity of said semiconductor material generated by said controlling light wave.

12. An infrared light modulator for spatially modulating an electromagnetic wave with a controlling time variable infrared wave, the modulator comprising:

a semiconductor material having an absorption band and sides polished to optical quality;

a first source of said infrared wave;

means for spatially modulating said infrared wave with information in the form of a 2-D pattern to generate a controlling light wave;

mans for delivering the controlling light wave onto the surface and into the volume of said semiconductor material, said controlling light wave generating a time variable spatial modulation of the complex permitivity of said semiconductor material in direct response to the intensity of said infrared wave;

a second non-infrared source of said electromagnetic wave, said second source arranged so that said electromagnetic wave is incident upon and reflected from said semiconductor material and time variable spatial variations of destructive and constructive interference of the reflected electromagnetic wave occur in accordance with the changing complex permitivity of said semiconductor material.

13. A multi-dimensional modulator for spatially modulating an electromagnetic wave with a controlling light wave, the modulator comprising:

a semiconductor material having two sides and an absorption band;

a first source of light having a wavelength spectrum located within the absorption band of said semiconductor material;

means for spatially modulating said light with information in the form of a 2-D pattern to generate said controlling light wave;

means for delivering said controlling light wave onto one side of said semiconductor material, said controlling light wave generating a 2-D distribution of the complex permitivity of said semiconductor material which follows the pattern of said controlling light wave;

a second source of said electromagnetic wave, said second source having a different wavelength spectrum than said first source and outside said absorption band, said second source arranged so that said electromagnetic wave is incident upon the other side of said semiconductor material and is directly spatially modulated in accordance with the changing complex permitivity of said semiconductor material generated by said controlling light wave.

14. A continuously distributed light controlled antenna employing a controlling light wave and providing 2-dimensional scanning of an electromagnetic wave, the antenna comprising:

a semiconductor material having an absorption band;

a first source of light having a wavelength spectrum located within the absorption band of said semiconductor material;

means for spatially modulating said light with information in the form of a 2-D pattern to generate said controlling light wave;

means for delivering the controlling light wave onto the surface and into the volume of said semiconductor material, said controlling light wave generating a 2-D distribution of the complex permitivity of said semiconductor material which follows the pattern of said controlling light wave;

a second source of an electromagnetic wave outside said absorption band, said second source arranged so that said electromagnetic wave defines an angle of incidence and an angle of diffraction with respect to said semiconductor material, and whereby the angle of incidence is synchronized with the 2-D time varying complex permitivity of said semiconductor material so that said second source is tracked and said angle of diffraction is constant.

* * * * *

UNITED STATES PATENT AND TRADEMARK OFFICE
CERTIFICATE OF CORRECTION

PATENT NO. : 5,305,123
DATED : April 19, 1994
INVENTOR(S) : Sadovnik et al.

It is certified that error appears in the above-indentified patent and that said Letters Patent is hereby corrected as shown below:

Col. 7, line 65, delete "aid" and substitute -- said --;

Col. 8, line 38, delete "mans" and substitute -- means --.

Signed and Sealed this

Second Day of May, 1995

Attest:

BRUCE LEHMAN

Attesting Officer          Commissioner of Patents and Trademarks